INVENTOR.
Peter Zerigian
BY
Ezekiel Wolf, Wolf & Greenfield
ATTORNEYS

United States Patent Office 3,228,414
Patented Jan. 11, 1966

3,228,414
VACUUM CONTROL DEVICE
Peter Zerigian, Bedford, Mass., assignor to Vacuum Engineering Company, Inc., North Billerica, Mass., a corporation of Delaware
Filed Apr. 15, 1963, Ser. No. 273,041
8 Claims. (Cl. 137—340)

The present invention relates generally to vacuum control apparatus and more particularly to a compact yet highly efficient valve trap baffle assembly for interconnecting a high vacuum diffusion pump and a system in which a vacuum is to be formed.

High vacuum, fluid diffusion pumps are used in conjunction with backing and booster pumps to create high vacuum, i.e., $1 \times 10^{-10}$ Torr and above, in vacuum systems. In most cases, the fluid used in the pump is vaporized and jetted out of a standpipe in the pump to entrain entering gas from the system to be evacuated. Many fluids are commonly employed in these pumps and include mercury, heavy petroleum oils, phthalic and sebacic esters, chlorinated hydrocarbons, polyphenyl ether and silicon oils. Particularly in the case of oil diffusion pumps, a small portion of the oil employed tends to diffuse back into the system being evacuated thus contaminating the system and in some cases resulting in inefficient vacuums being created. For this reason, high vacuum fluid diffusion pumps are sometimes provided with baffles, freeze-out traps and the like to prevent back streaming of the pump fluid.

In addition to the back streaming of operating fluids the use of fluid diffusion pumps in conjunction with systems to be evacuated presents problems of providing suitable shut-off valves from the pump to the system, corrosion protection of connecting parts, and maintenance of the distance between the pump and system as short as possible to optimize conductance characteristics.

Accordingly, it is an object of this invention to provide an apparatus for connecting a high vacuum fluid diffusion pump to a system to be evacuated which is extremely efficient in preventing undesired fluid flow into the system from the pump. The present invention also minimizes residual leaks and in leaks by providing an integral structure which requires a minimum number of sealed connections.

It is another object of this invention to provide an apparatus in accordance with the preceding object which is highly compact and permits vacuum tight connection of the pump to the system in closely spaced relationship. The present invention provides optimum conductance of gas molecules from the chamber being evacuated to the pump by minimizing the length of the unit and optimizes its width dimensions.

It is another object of this invention to provide an apparatus in accordance with the preceding objects which is highly versatile and can be interchanged to accommodate varying dimension systems and pumps.

It is still a further object of this invention to provide an apparatus in accordance with the preceding objects which does not itself generate or contribute gases to the system.

According to the invention, a pressure tight housing has a first opening for connection to a system to be evacuated and a second opening for connection to a high vacuum fluid diffusion pump. A high vacuum shut-off valve is positioned in the housing aligned with the first opening and has a control mechanism passing through a wall of the housing to allow opening and closing of the valve without change of the environment within the housing. A cryogenic baffle is positioned in the housing aligned with the high vacuum valve and prevents migration of fluid (normally in the form of gas or gas molecules) from the pump. A cooling baffle is positioned in the housing between the cryogenic baffle and the pump housing opening and acts as a gas barrier in addition to preventing conduction of heat from the pump to the system or to the cryogenic baffle. Preferably gases to be evacuated from the system pass from the first opening to the second opening of the apparatus of this invention, upon opening of the high vacuum valve. Preferably all parts of the apparatus of this invention which are exposed to the gaseous stream are made of metal or other materials which do not themselves generate gases at low pressure conditions.

Other features, objects and advantages of the invention will be better understood and appreciated from the following detailed description of one embodiment thereof selected for purposes of illustration and shown in the accompanying drawings, in which.

Figure 1:
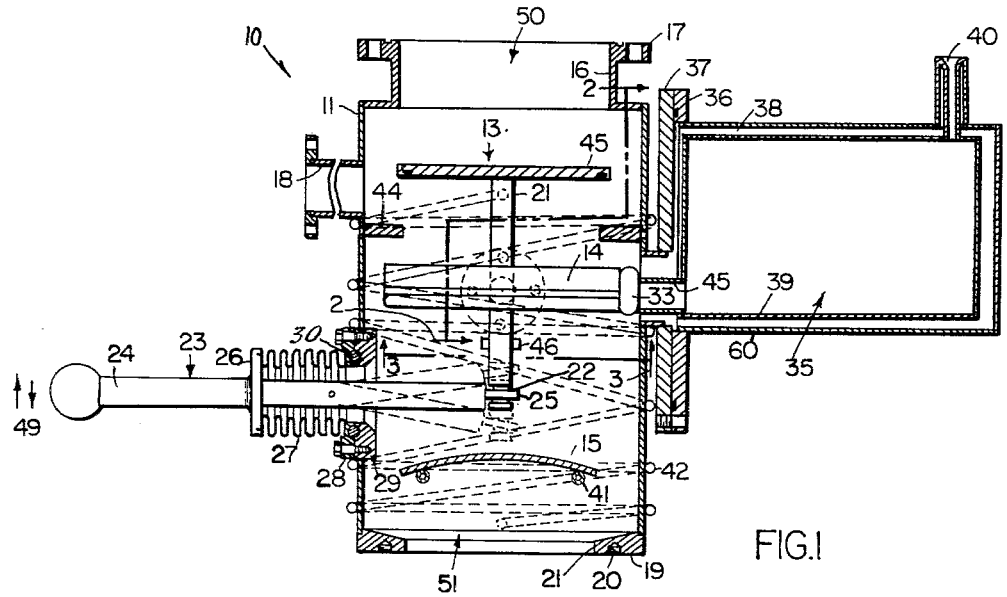
FIG. 1 is a cross-sectional view of a preferred embodiment of an apparatus of this invention.
Figure 2:
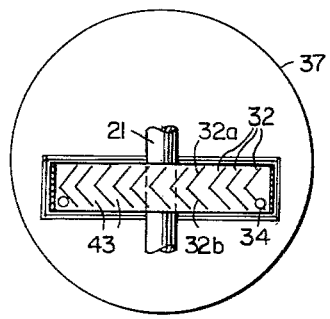
FIG. 2 is a side cross-sectional view of the cryogenic baffle and associated structure taken through line 2—2 of FIG. 1.
Figure 3:
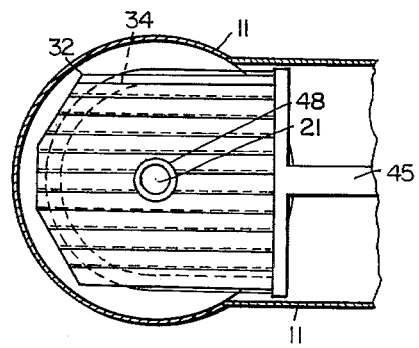
FIG. 3 is a bottom view of the cryogenic baffle taken through line 3—3 of FIG. 1.

Referring now to FIG. 1, a preferred embodiment of the apparatus 10 of this invention is shown having a cylindrical pressure tight casing or housing 11 in association with an oil-diffusion pump not shown. Mounted within the housing 11 is a vacuum shut-off valve 13, a cryogenic baffle 14 and a water baffle 15.

The pressure tight housing 11 has a first portion defining an opening 16 with an outwardly extending circular flange 17 for attachment of the apparatus to any desired system to be evacuated. An exhaust port 18 provides an attachment outlet for connection of a backing vacuum pump to the housing. The port 18 is positioned before or above the shut-off valve 13 in the housing 11 so that a preliminary vacuum may be created in the system by mechanical or other booster pumps after which the valve 13 may be opened and the oil diffusion pump operated. A second end portion of the casing 11 is provided with an inturned ring 19 having bolt receiving holes 20 for attachment of the oil diffusion pump, to the pressure tight casing 11. When the valve 13 is in its open position as shown in FIG. 1 a fluid chamber or passageway extends from opening 16 to opening 21 of the apparatus. This passageway is tortuous so that there can be no straight line passage of fluids through the chamber.

Valve 13 is positioned closely adjacent the opening 16 but beyond the backing pump port or outlet 18. The valve 13 comprises a valve seat 44 which is preferably a circular ring-shaped member affixed to the housing 11 and extends inwardly in a plane perpendicular to the axis of the housing 11. A disc 45 forms the opening and closing member of the valve 13 and is adapted to move axially of the housing 11 onto and out of contact with the valve seat 44. An axially located rod or valve spindle 21 is secured to the valve member 45 at an upper end and passes through a circular opening 46 in the chevron cryogenic baffle 14. A mid-portion of the rod 21 is slideably positioned in a mounting ring 46 and is secured to the housing 11 by a bracket (not shown). A lower end of the rod 21 is bored for connection of the rod 21 to a control valve mechanism 23. The control valve mechanism 23 comprises a control handle 24 which extends from the outside of the housing 11 into the housing and has a pin-shaped end 25 fitting within bore 22 of the rod 21. A mid-portion of a handle 24 is bonded by welding or other conventional means to a top disc-shaped member 26 of a resilient metallic bellows assembly 27. The bellows assembly 27 is affixed to an outlet flange 29 of the housing 11 by means of an integral flange coupling 28 bolted to the outlet flange 29. A metallic O-ring 30 is clamped by the bolt-flange arrangement of 28 and 29 to prevent passage of fluids through the seal formed by these flanges. Thus, all members of the control valve mechanism 23 are metallic and therefore are impermeable and do not generate gases as would organic components. The resiliency and yieldability of the bellows 27 allows the control handle 24 to be manipulated in the direction of the arrow shown at 49 to open and close the valve 13. The normal position of the valve is shown in FIG. 1 with the valve in the open position. However, the valve may be retained in any desired position by hand or by using suitable conventional holding means for retaining the handle 24 at its outer end in a desired position such as a conventional indexing bracket. When the valve is open as shown in FIG. 1 the disc 45 and seat 44 combined to prevent straight line movement of fluids through the chamber and provide a tortuous path that must be overcome if oil molecules are to enter the system from the pump.

Directly below the valve assembly 13 is a cryogenic baffle which preferably comprises a chevron trap extending perpendicularly to the axis of the housing 11. The chevron trap 14 preferably comprises a series of nested, spaced chevron cross-sectioned solid fin member 32 arranged one above another and generally parallel to each other across the tubular passageway formed by the housing. If desired the fin members 32 may be hollow and connected to the distribution tube 34 for passage of the cooling fluid through the fin members. Walls 32a and 32b of each section preferably meet at right angles although other angles may be used. The chevrons 32 are cooled by conduction from a liquid manifold 33 on which the chevrons are mounted. The manifold 33 has an interconnected generally horseshoe-shaped distribution tube 34 positioned adjacent one side of the chevron stacked members and passing through a snugly fitting hole in each member. The manifold 33 is directly interconnected by a feed tube 45 with a liquid nitrogen or other cooling medium reservoir 35. Preferably the cooling fluid reservoir 35 is a double-walled cylindrical vessel having an outwardly extending circular connection flange 36 which is secured to a corresponding outwardly extending connection flange 37 from the housing 11. In a preferred form of the invention, a space 38 is provided between inner wall 39 and outer wall 60 of the reservoir. The space or passageway 38 may be sealed previous to connection to the housing 11; however, in the preferred form of the invention the space 38 is interconnecting with the inner hollow portion or chamber of the housing 11 and a vacuum is provided by the vacuum pumps attached to the system. This feature allows the cold surface area of wall 39 to additionally act as a freeze-out portion of the apparatus for condensing water or other vapors in the system.

A fill and evaporation port 40 is provided at an upper portion of the reservoir 35 through which liquid nitrogen at approximately minus 300° F. or other liquid cooling materials may be circulated through the manifold and tube 34. The cooling fluids cool the chevron members 32 by means of conduction since the cooling tube 34 and manifold 33 are in direct contact with each of the chevron members 32. Preferably stainless steel or copper are employed in manufacturing the chevron members 32 to allow quick dissipation of any heat encountered in the housing 11 and maintenance of the cryogenic nature of the chevrons.

The chevron baffle 14 covers substantially all of the passageway afforded by the housing 11 so that gases or fluids passing through the housing 11 are directed through passageways 43 formed between the chevron members 32 and are normally fully exposed to the cooling and freezing influence of the liquid nitrogen. The chevrons 32 provide increased surface for heat exchange over a given axial housing distance as compared with flat fins.

Directly below the cryogenic baffle 14 is located a preferably disc-shaped slightly domed water baffle 15. The water baffle 15 acts to minimize conduction of heat from the oil diffusion pump, which is normally maintained at about 250° F., to the chevron baffle 14. In addition, the water baffle 15 acts as a condensation means for condensing a portion of the oil vapors escaping from the oil diffusion pump. Oil collecting on top of the baffle 15 rolls off because of its dome shape.

Figure 4:
FIG. 4 is a detail of a modification of the invention.

Preferably the baffle 15 is cooled by continuous circulation of cooling water through a circularly arranged water tube 41 which extends into the housing 11 through vacuum tight openings in a side wall of the housing. In some forms of the invention, the entire disc-shaped baffle 15 may be hollow and water or other cooling fluid circulated through chambers provided by the hollow portion. The water circulated through the tubes 41 may be connected to the same system as a cooling water tube 42 which helically extends around the outer portion of the housing 11. The water tube 42 acts to cool the housing 11 and minimize conduction of heat from the oil diffusion pump as well as from the surrounding environment. Other cooling fluids may be used to cool the baffle 15 if desired. An alternate embodiment of the baffle 15 is shown in FIG. 4. Here the baffle is formed of a series of chevrons 15a mounted and secured across the cooling tubes 42. Oil will condense on the chevrons and drop between them into the pump.

In the operation of the vacuum trap baffle assembly, upon opening of the valve 13 by means of control mechanism 23 and actuation of the oil diffusion pump, gases from the system pass in the direction of the arrow 50 while oil molecules in minute amounts tend to escape from the oil diffusion pump and pass upwardly in the direction of the arrow shown at 51. The water baffle 15 is maintained at a temperature preferably in the range 50 to 650 F., and condenses a portion of the oil molecules passing upwardly in the chamber or housing 11. Additional amounts of oil molecules are trapped by the chevron baffle 14 which is practically maintained at approximately −300 to −320° F. Lower temperatures are preferred. The distance between flanges 17 and 19 may be maintained extremely small preferably in the nature of about 10 to 17 inches when vacuums of $1 \times 10^{-10}$ Torr are produced in the system with which the apparatus is utilized.

It is evident that those skilled in the art may now make numerous modifications of and departures from the specific embodiments described herein without departing from the inventive concepts. For example, the specific configuration of the reservoir and housing may vary as may the particular size and shape of the cryogenic and water baffles. Varying numbers of chevron members may be employed.

Consequently the breadth of this invention is to be construed as limited only by the spirit and scope of the appended claims.

What is claimed is:

1. An apparatus for connection between a system to be evacuated and a high vacuum fluid diffusion pump, said apparatus being designed to prevent back flow of fluid from said pump while allowing evacuation of gases from said system and comprising an enclosing unitary housing having a first and second portion for connection to said system and said pump respectively, a shut-off valve extending transversely in said housing for connecting and disconnecting said system with said pump, a seat in said housing for said valve, a cryogenic baffle comprising a plurality of nested spaced members extending transversely of said housing and positioned in said housing aligned with said valve and adapted to prevent migration of gas from said pump to said system, a cryogenic fluid tank for cooling said members located adjacent said housing out of alignment with said baffle and valve, and a cooling baffle extending transversely of said housing aligned with said valve and cryogenic baffle in said housing and adjacent said second housing portion for providing a partial fluid barrier and preventing conduction of heat from said pump to said system, said valve, cryogenic baffle and cooling baffle providing compact construction with a short axial distance between said first and second portions.

2. An apparatus in accordance with claim 1 and further characterized by said valve, actuating means, cryogenic baffle and cooling baffle being composed entirely of metallic materials.

3. An apparatus in accordance with claim 1 and further comprising a stem on said valve, said stem passing through an opening defined by said cryogenic baffle, an actuating handle removably linked to said stem between said cryogenic baffle and said cooling baffle, and a portion of said handle passing out of said housing constructed and arranged to permit movement of said valve.

4. An apparatus in accordance with claim 1 wherein said cryogenic baffle comprises a plurality of chevron members extending across and substantially filling a transverse portion of said housing and arranged in nested spaced relationship whereby large surface areas on said members are provided for heat exchange.

5. An apparatus in accordance with claim 1 wherein said housing is generally cylindrical and said cryogenic baffle and said valve disc are located in spaced planes each at right angles to an axis of said cylindrical housing.

6. An apparatus in accordance with claim 5 wherein said cryogenic baffle is connected to a cooling media reservoir mounted outside of said cylindrical housing whereby said baffle may be temperature controlled by controlling the temperature of fluid cooling media within said reservoir and consequently within said cryogenic baffle.

7. An apparatus for connection between a system to be evacuated and a high vacuum fluid diffusion pump, for allowing evacuation of said system while preventing fluid flow from said pump to said system, said apparatus providing an axially extending enclosure unitary housing having a first and second portion for connection to said system and said vacuum pump respectively, a metallic shut-off valve positioned in said housing aligned with said first portion for connecting or disconnecting said system to said pump, said valve having an opening and closing disc normal to the axis of said housing providing a tortuous passageway between said first and second housing portions, a seat in said housing for said valve, actuating means for said valve positioned partially within said housing and passing out of said housing whereby said valve may be actuated from without said housing without substantially changing or effecting environment conditions within said housing, said actuating means comprising an elongated handle having an intermediate portion thereof affixed to a metallic bellows and passing within said bellows to the inside of said housing, said housing defining a vacuum port positioned between said valve disc and said first housing portion, a cryogenic baffle positioned in said housing aligned with said shut-off valve and adapted to prevent migration of gas from said pump to said system when said valve is opened, said cryogenic baffle comprising a plurality of nested chevron members, a liquid manifold contacting said chevron members, said manifold being interconnected with the cryogenic liquid tank positioned externally of said housing, and a cooling baffle positioned in said housing between said cryogenic baffle and said second housing portion acting as a gas barrier and preventing conduction of heat from said pump to said system 8. An apparatus in accordance with the apparatus of claim 7 wherein said tank has a surrounding passageway interconnected with said tortuous enclosed space of said housing.

References Cited by the Examiner

UNITED STATES PATENTS

| 2,218,886 | 10/1940 | Krause | 251—315 |
| 2,969,809 | 1/1961 | Klingler | 251—335 |
| 3,019,809 | 2/1962 | Ipsen et al. | 137—340 |
| 3,081,068 | 3/1963 | Milleron | 62 |

M. CARY NELSON, *Primary Examiner.*